F. FITZPATRICK.
Straw Cutter.
No. 12,974.
Patented May 29, 1855.
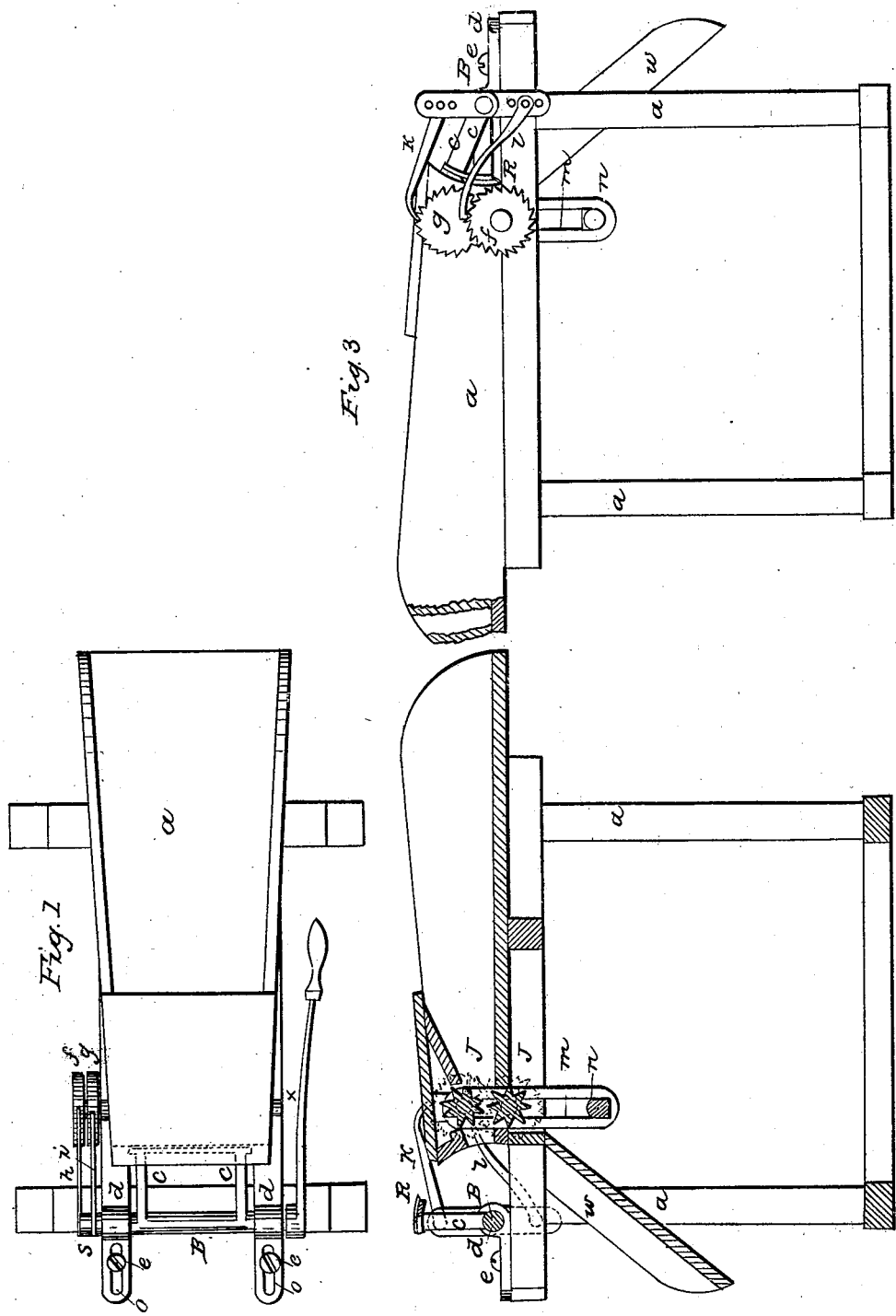

UNITED STATES PATENT OFFICE.

FRANCIS FITZPATRICK, OF CINCINNATI, OHIO.

STRAW-CUTTER.

Specification of Letters Patent No. 12,974, dated May 29, 1855.

*To all whom it may concern:*

Be it known that I, FRANCIS FITZPATRICK, of the city of Cincinnati, county of Hamilton, and State of Ohio, have invented a new and useful Improvement in Straw-Cutters; and I do hereby declare that the following is a full and exact description thereof, reference being had to the accompanying drawings and to the letters and figures of reference marked thereon, similar letters referring to corresponding parts.

The nature of my improvement consists in the arranging the rock shaft, on which the arms and knife are so placed as to give a draw cut, in front of the straw box, so that when the knife is cutting, its tendency to push away from, or leave the straw, shall be resisted or met on the ends of the arms, and through them, by the shaft, in a line parallel to the thrust, and thus be held up to the straw, while the mouth of the straw box is unencumbered by any machinery to prevent the feeding up of the uncut, or delivery of the cut straw.

To enable others skilled in the art to make and use my improvement I will proceed to describe its construction and operation by referring to the accompanying drawings which form part of this specification.

Figure 1 represents a top view of a machine in a complete state. Fig. 2 represents a longitudinal sectional view of the same through the center of the cutting box and Fig. 3, is a side elevation of the machine showing the ratchet wheels attached to the feeding rolls and manner of working the same with the feeding fingers which receive their motion from the rock shaft to which the knife is attached.

*a, a, a,* represents the framing and straw box; B, the rock shaft as I demonstrate it which is provided with two arms *c, c,* as represented in Fig. 1, the ends of which are connected together by a flange to which the knife R, is attached by screws or otherwise equivalent as is represented in the different drawings.

*x* represents the lever for operating the rock shaft furnished with a handle at the end as represented in Fig. 1.

S, represents a double arm extending above and below the rock-shaft and attached to it for operating the feed rolls J. J. The arm is attached on the opposite side from the lever *x* and furnished with feeding fingers *k* and *l* that work into the ratchet wheels *g* and *f*. Finger *k* works the wheel *g*, attached to the upper feeding roll J and finger *l* works the wheel *f* attached to the lower feed roll, as are represented in Fig. 3, of the drawings.

*d, d,* are boxes or bearings in which the rock shaft B works. These boxes are provided with slot holes *o, o,* for the purpose of adjusting the knife R to the cutting box—and are held to their place by means of screws *e e*.

*w*, is a sheet for the purpose of conducting the cut straw to the front of the box, as represented in Figs. 2 and 3.

*m, m,* represents two pieces of iron framing in which the top feeding roller works—and each of these frames is fitted to slide up and down on the inside of the cutting box and the lower part of the end frames are connected together by a rod *n* to which a weight is attached for the purpose of drawing the top feeding roll down in close contact with the lower feeding roll in order to clasp the straw being cut—so as it may be presented to the knife by the mechanical means before described—and as represented in the accompanying drawings.

Having thus fully described the nature of my invention what I claim therein as new, and desire to secure by Letters Patent is—

Arranging the rock shaft B, on which the arms and knife are so placed as to give a "draw cut," in front of the straw box, and distant therefrom, so that the tendency of the knife to push away from, or leave the straw, shall be resisted, or met by the ends of the arms, in a line parallel to the thrust, and thus be held up to the straw, while the mouth of the straw box is unincumbered by any machinery to prevent the feeding up of the uncut, or delivery of the cut straw, as represented.

FRANCIS FITZPATRICK.

Witnesses:
MARTIN BENSON,
L. W. SMITH.